(12) United States Patent
Pflaum

(10) Patent No.: US 6,700,954 B1
(45) Date of Patent: Mar. 2, 2004

(54) TELEPHONE WITH INTEGRATED DIGITAL ANSWERING MACHINE FOR VOICE AND FAX DATA

(75) Inventor: Karl-Heinz Pflaum, Bocholt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/380,953
(22) PCT Filed: Mar. 11, 1998
(86) PCT No.: PCT/DE98/00718
§ 371 (c)(1),
(2), (4) Date: Sep. 10, 1999
(87) PCT Pub. No.: WO98/40999
PCT Pub. Date: Sep. 17, 1998

(30) Foreign Application Priority Data

Mar. 11, 1997 (DE) .......................................... 197 09 973

(51) Int. Cl.$^7$ ............................................ H04M 11/00
(52) U.S. Cl. ................ 379/88.13; 379/93.05; 379/100.08
(58) Field of Search ............................. 379/67.1, 88.13, 379/93.05, 100.02, 100.03, 100.05, 100.13, 100.15, 100.16, 100.01, 215.01, 210.01, 211.01, 100.08, 211.02, 212.01, 88.22, 88.27, 88.28; 358/404

(56) References Cited

U.S. PATENT DOCUMENTS

| | | | |
|---|---|---|---|
| 4,885,764 A | * | 12/1989 | Miwa ........................... 379/70 |
| 5,014,296 A | | 5/1991 | Saigano |
| 5,550,649 A | * | 8/1996 | Wong et al. ................. 358/479 |
| 5,696,812 A | * | 12/1997 | Ono ............................. 379/88 |
| 5,706,334 A | * | 1/1998 | Balk et al. ..................... 379/67 |
| 5,727,047 A | * | 3/1998 | Bentlet et al. ................. 379/93 |
| 5,835,577 A | * | 11/1998 | Disanto et al. ........... 379/93.19 |

FOREIGN PATENT DOCUMENTS

| | | |
|---|---|---|
| EP | 0 693 845 | 7/1995 |
| GB | 2 232 324 | 12/1990 |
| JP | 08-149215 | 6/1995 |

OTHER PUBLICATIONS

"New Answering System Has Selective Playback", AT&T Technology, vol. 10, No. 2, Summer 1995, p. 13.

Xerox 3006 product brochure, Das Kommunikationstalent für den Arbeitsplatz, Firmenschrift: Rand Xerox GmbH, Düsseldorf, p. 4.

Virtual Secretary, IBM Technical Disclosure Bulletin, vol. 40, No. 1, Jan. 1997, p. 89.

* cited by examiner

Primary Examiner—Fan Tsang
Assistant Examiner—Ovidio Escalante
(74) Attorney, Agent, or Firm—Bell, Boyd & Lloyd LLC

(57) ABSTRACT

Digital answering machine that can receive not only voice but also fax information via a telephone line. In order to receive and send faxes with a computer, it is inventively provided to expand a digital answering machine such that incoming faxes are intermediately stored in a memory and can be transmitted to the computer via an interface after the computer is switched on.

16 Claims, 1 Drawing Sheet

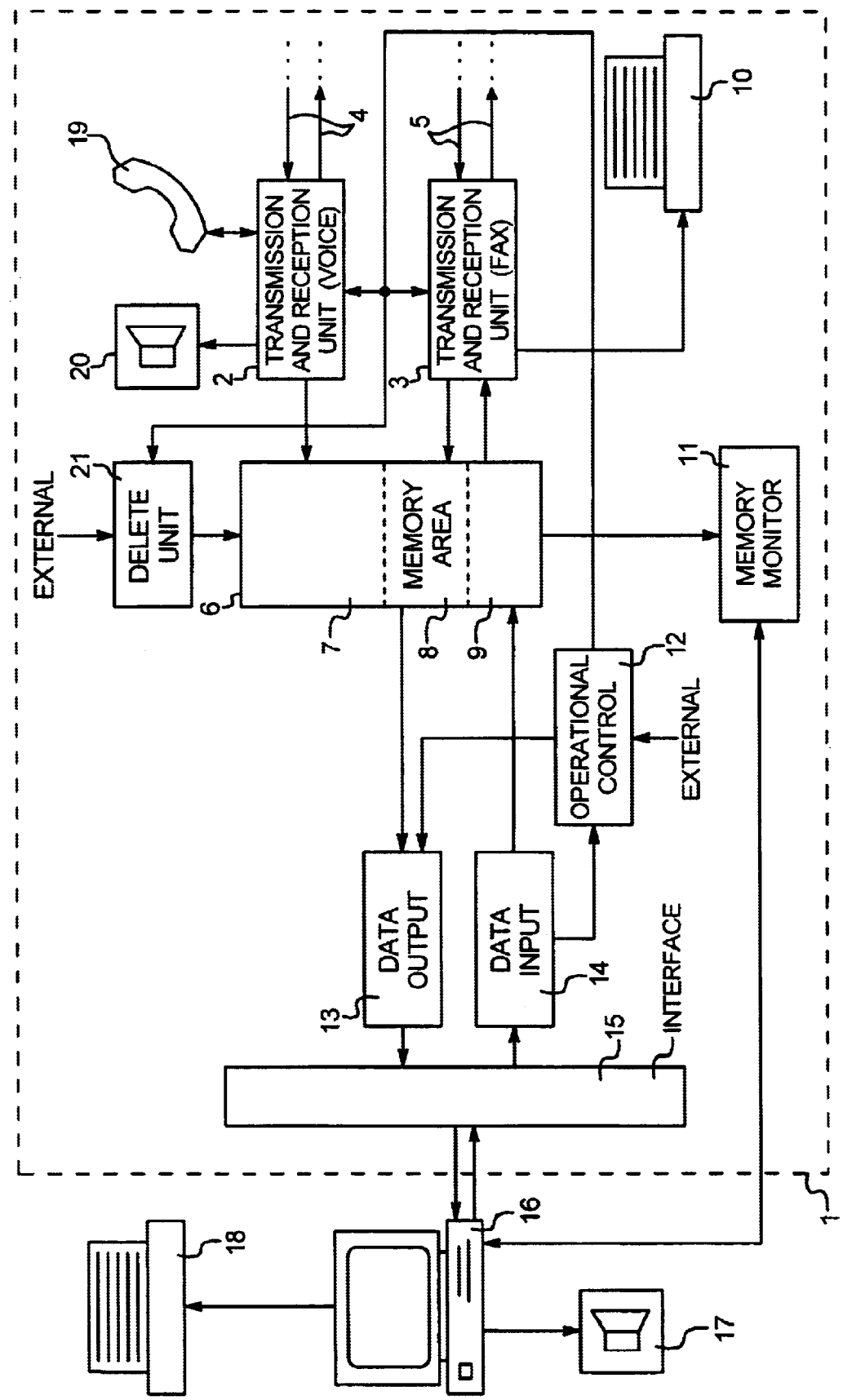

TELEPHONE WITH INTEGRATED DIGITAL ANSWERING MACHINE FOR VOICE AND FAX DATA

The present invention is directed to a telephone with digital answering machine. More particularly, the present invention is directed to a telephone digital answering machine, also referred to below as a combined telephone/answering device, with which fax information can also be processed in addition to voice information.

As is known, fax messages transmitted via a telephone network can be received by fax machines that are connected to an ordinary TAE telephone socket and than can be equipped as a stand-alone device or with an integrated telephone. Moreover, machines are already known wherein, in addition to the fax and telephone function, the function of a digital answering machine has already been integrated. Such a multi-functional device, for example, is the Telfax 890 or the Telfax 840 AB manufactured by Siemens A. C. Fax reception with such devices is unproblematical since a fax message received via the telephone network is printed directly out by the fax machine.

European Patent Application 0 693 845 discloses a digital answering machine with a voice control that is composed of a digital signal processor, a memory for storing software for the execution of basic and special functions, a memory for voice storage, an analog interface with an analog-to-digital-to-analog converter and loudspeaker and microphone connected thereto, as well as computer interface with which a connection to a microcontroller is set up for calling and starting basic and special functions of the telephone answering machine.

An alternative thereto is the reception of fax data with a computer. When, however, one wishes to receive faxes with a computer, for example, a personal computer, then a modem equipped with a fax function is required for this purpose, this being connected, on the one hand, to the telephone network and, on the other hand, to a serial interface of the computer. The modem converts the analog telephone or, fax signals received from the telephone network into digital signals to be processed by the computer. When a fax is to be sent, then the digital signals transmitted from the computer to the modem are converted into analog signals at the output side, these being subsequently transmitted via the telephone network to a recipient. Such a so-called fax modem, however, does not work independently, i.e. it for fax reception is necessary that the computer be turned on in order to be ready to receive at any time. Due to the high energy consumption of the computer, however, this is disadvantageous and therefore undesirable.

The aforementioned problem can be solved, first, in that the fax modem is equipped with an enhanced functionality that makes it possible for the fax modem to accept incoming fax calls and to correspondingly process what are referred to as fax protocols. Further, the fax modem is equipped with a memory that intermediately stores data corresponding to the arriving fax messages, so that, after a computer connected to the fax modem is turned on, the user can transfer the data into the computer as needed and can output the fax message. What is problematical given this solution, however, is that a number of additional hardware units such as, for example, a control means, a memory or a voltage supply for the buffer memory, must be provided for the fax modem, so that the structure of the fax modem not only becomes clearly more complicated but the manufacturing costs of the fax modem are substantially increased.

Another solution was therefore proposed for the aforementioned problem in accord wherewith a turn-on logic is connected between the fax modem and the telephone connection, this recognizing incoming fax calls and, given the recognition of fax calls, automatically turning on the computer connected to the fax modem. What is disadvantageous about this solution, however, is that the computer can only process fax information when it has "booted up" after being turned on, i.e. when it is operationally ready. This, however, can last some time, so that the calling fax machine may potentially in turn turn off, since it was not capable of transmitting its fax data during a presented time. Moreover, the service life of the computer is clearly reduced by the frequent turning on and off of the computer.

To that end, U.S. Pat. No. 5,550,649 discloses a solution wherein an auxiliary means is connected to a telephone line and to which a telephone, a computer and a television set can be connected. This auxiliary means can receive and send faxes, is provided with an answering machine function and has an integrated computer modem. The device is equipped with a first memory for storing voice data and with a second memory for storing fax data. The device only switches the connected computer on when the memory capacity of the voice or fax data store is exhausted, whereupon the arriving voice or fax data are conducted to the computer instead of being stored in the first and/or second fully occupied memory.

Further, German Patent Application No. 94 04 464 discloses a telephone system with an automatic answering machine that is fashioned such that the answering machine comprises a housing with a disk drive and digitally stores fax signals contained in the telephone call on a diskette inserted into the disk drive. For displaying and/or printing the fax signals stored on the diskette, the diskette is placed into the activated computer equipped with a connected printer.

SUMMARY OF THE INVENTION

It is an object of the present invention to provide a telephone with integrated answering machine with which fax messages can be reliably received without great technical outlay.

This object is achieved in accordance with the invention in a telephone with integrated digital answering machine having a first reception unit for receiving voice data transmitted via a first transmission link; a second reception unit for receiving fax data transmitted via a second transmission link; a first transmission unit for sending voice data to be transmitted via the first transmission link; a permanently integrated semiconductor memory for storing the received voice and fax data; an interface for interfacing to at least one data processing unit; an output unit for transmitting the voice and fax data to the data processing unit via the interface; and a memory monitor for activating the data processing unit for a transmission of the voice and fax data intermediately stored in the memory and for a transmission of the voice and fax data immediately received via the first and second reception units when the memory is filled to a predetermined capacity.

It is inventively provided that a traditional telephone with an—integrated, digital answering machine is expanded such that incoming faxes can be received and intermediately stored with this digital answering machine, and the data corresponding to the stored fax is transmitted to a computer via a suitable interface after a computer is turned on. Since a memory for the answering machine function is already provided in the combined telephone/answering device, this memory can be expanded without greater technological outlay or, the fax data together with the voice information data of the answering machine can be stored in the same memory.

An advantage of the inventive solution is comprised in that only a slight circuit-oriented modification is required for the realization of the fax reception with a combined telephone/answering machine device, so that the fax function can be integrated into existing, combined telephone/answering machine devices with little financial outlay. Since the computer is connected to the inventive, combined telephone/answering machine device, both the incoming fax information as well as the voice information of the answering machine—after the computer is turned on—can be directly transmitted to the computer as soon as it is ready to operate. As a result of this inventive measure, the recording duration of the digital answering machine function as well as the buffer memory for the fax function are nearly unlimited, since the corresponding data no longer need remain stored in the digital answering machine. Alternatively, a switch mechanism can also be provided that is connected, on the one hand, to the computer and, on the other hand, to the memory of the inventive digital answering machine and that monitors the occupation of the memory. When the memory of the digital answering machine is filled up to a specific degree, then this switch mechanism automatically switches the computer on and thus occasions that both the information stored in the memory as well as the information that arrives is directly transferred to the computer, so that the memory of the digital answering machine is relieved. It can be assured in this way that fax information is intermediately stored in the memory of the digital answering machine during the time the computer runs up and cannot be lost. Moreover, the computer has to be turned on significantly less frequently for securing fax reception than in the known prior art, so that the service life of the computer is not significantly deteriorated. Another advantage of the present invention is that, due to the possible connection between the computer and the inventive digital answering machine or, the telephone with integrated answering machine, settings of the digital answering machine or, of the telephone can be implemented expediently proceeding from the computer and can be transferred via the interface of the digital answering machine.

These and other features of the invention(s) will become clearer with reference to the following detailed description of the presently preferred embodiments and accompanied drawings.

DESCRIPTION OF THE DRAWINGS

FIG. 1 is a schematic block diagram of a preferred embodiment of the digital answering machine according to the present invention.

DETAILED DESCRIPTION OF THE PRESENTLY PREFERRED EMBODIMENTS

The combined telephone/answering machine device 1 shown in FIG. 1 comprises, first, a transmission and reception unit 2 for transmitting and receiving voice information via a telephone line 4. This transmission and reception unit 2 serves both for transmitting ordinary telephone information input or, output via a telephone receiver 19 as well as for the output of answering machine message text, as well as for accepting, storing and outputting messages of an answering machine via a loudspeaker 20. In addition to the transmission and reception unit 2 for voice information, a transmission and reception unit 3 for fax information is inventively provided, this usually identifying incoming fax information on the basis of a co-transmitted identifier and receiving the fax information transmitted via a telephone lines or, sending this to a different fax machine (not shown). The combined telephone/answering machine device 1 can be equipped with a printer 10 that prints received fax information directly out. As a rule, the telephone lines 4 and 5 are identical.

In order to process incoming faxes, however, with a computer 16, for example with a PC, it is inventively provided to initially buffer incoming fax information with the reception unit 2 or 3 in a memory 6 and to subsequently output this to the computer 16 via a corresponding data output means 13 and an interface 15, after the computer 16 has been turned on. For example, the data transmission can thereby ensue after the presence of a corresponding request instruction. The memory 6 can comprise separate memory units 7, 8 or, 9 that are provided for storing voice information for the answering machine mode, for storing incoming fax information or, for storing fax information to be sent. Further, a memory monitor 11 is present that continuously monitors the occupation of the individual memory areas of the memory 6 and, for example, automatically stores incoming fax information in the memory area 7 provided basically for voice information when the memory area 8 provided for the fax information has been filled to a specific degree. Alternatively, however, it can likewise be provided that no distinction is made between the individual memory areas 7, 8 and 9, but that the individual information is stored in the common memory means 6 successively in the sequence of their arrival. The voice and fax information is stored together with a corresponding code or a start and end identifier, so that the desired information—after the computer 16 is turned on—can in turn be read out from the memory 6. The memory monitor 11 monitors the occupancy of the overall memory 6 and, if the memory 6 is filled to a specific degree, automatically switches the computer 16 on, so that, after the computer 16 has booted up, incoming voice and/or fax information are no longer stored in the memory 6 but are loaded directly into the computer 16 via the data output means 13 and the interface 15 and can be processed thereat. Inventively, thus, it is not only fax information but also call information of the answering machine function that can be transmitted to the computer 16, where, particularly with the assistance of an internal sound card and a loudspeaker 17, these can be played back. Due to the combination of the digital answering machine 1 with the computer 16 shown in FIG. 1, both incoming voice as well as fax information can be transmitted to the computer 16, so that the memory 6 of the combined telephone/answering machine device 1 is relieved and a nearly unlimited capacity is present for recording the voice or, fax information.

When, given reception of the voice or, respectively, fax information via the transmission and reception units 2 or, 3, the memory monitor 11 recognizes that the computer 16 connected to the interface 15 of the combined telephone/answering machine device 1 is already turned on, it can also be provided that the received data is directly transmitted to the computer 16 via the data output unit 13 and the interface 15 without buffering in the memory 6, so that the memory 6 can be further relieved. The voice or, fax information received by the computer 16 can be visually or acoustically output. In particular, the voice information required for the answering machine function can either be acoustically output via a sound card internally provided in the computer 16 with a loudspeaker 17 connected thereto or can be visually output via a monitor of the computer 16 or a printer 18 connected thereto. The same is also true of the fax information received by the computer 16, whereby, for example, a visually display of the fax information is possible.

As a result of the inventively provided connection of the computer 16 to the interface 15 of the combined telephone/answering machine device 1, operating settings of the telephone, answering machine and/or fax functions of the combined telephone/answering machine device 1 shown in FIG. 1 can be expediently implemented proceeding from the computer 16. To this end, a data input unit 14 is connected to the interface 15 of the combined telephone/answering machine device 1, which is usually formed by a serial interface, this being provided for the reception of information or signals that are transmitted from the computer 16 via the interface 15 to the combined telephone/answering machine device 1. The information transmitted from the computer 16 can, for example, be instructions for setting specific operating parameters of the combined telephone/answering machine device 1. Such instructions are forwarded to an operational control unit 12 that sets specific operating parameters of the data output unit 13 as well as of the transmission and reception units 2 and 3. Via the computer 16 and the operational control unit 12, thus, for example, a recording length for voice information of the answering machine reception unit 2 or a format of the data to be transmitted via the data output unit 13 and the interface 15 to the computer 16 can be set. Further, a delete signal for erasing individual areas of the memory 6 or, the entire memory 6 can be transmitted to a delete unit 21 via the operational control unit 12. The operational control unit 12 and the delete unit 21, however, can also be externally operated upon by an operator with the assistance of correspondingly provided key fields (not shown) of the combined telephone/answering machine device 1. It can thus be seen that, with the assistance of the connection of the computer 16 to the interface 15 of the combined telephone/answering machine device 1, generally arbitrary operating settings of the telephone, answering machine or fax device implemented in the inventive combined telephone/answering machine device 1 can be set. Thus, for example, a digital telephone book stored internally in the combined telephone/answering machine device 1 for the telephone and fax mode can also be edited via the computer 16.

Finally, fax information to be sent via the computer 16 can also be transmitted to the combined telephone/answering machine device 1. To this end, the layout of a fax to be sent as well as the text to be transmitted is drafted at the computer 16 and, after the end of this procedure, the corresponding data is transmitted via the interface 15 to the data input unit 14 of the digital answering machine 1. This data is therefor intermediately stored in a memory area 9 of the memory 6 and is forwarded to the transmission and reception unit 3 that converts the digital data received from the combined telephone/answering machine device 1 into corresponding analog fax information to be sent via the transmission link 5. When the transmission lines 4 and 5 are digital transmission lines of a digital telephone network, of course, the corresponding voice and fax information are received and transmitted in digital form by the corresponding transmission and reception unit 2 or, 3.

As a result of the inventive connection possibility of a computer 16 to a correspondingly provided interface 15 of the combined telephone/answering machine device 1, it is thus assured that, given the assistance of the device 1 shown in FIG. 1, fax information cannot only be received with the computer 16 but can also be sent from the computer 16 via the combined telephone/answering machine device 1. Since a combined telephone/answering machine device already contains memories for the answering machine function, the solution shown in FIG. 1, for the problem on which the present invention is based, can be realized without great technical outlay, so that the inventively desired fax function can be integrated without further ado into combined telephone/answering machine devices that already exist. Moreover, due to the connection of a computer 16 to the combined telephone/answering machine device, arbitrary functions of the telephone, answering machine or fax device implemented in one machine can be centrally controlled via the computer 16.

Although modifications and changes may be suggested by those of ordinary skill in the art, it is the intention of the inventors to embody within the patent warranted hereon all changes and modifications as reasonably and properly come within the scope of their contribution to the art.

What is claimed is:

1. A telephone with an integrated digital answering machine, comprising:
   a first reception unit for receiving voice data transmitted via a first transmission link;
   a second reception unit for receiving fax data transmitted via a second transmission link;
   a first transmission unit for sending voice data to be transmitted via said first transmission link;
   a permanently integrated semiconductor memory for intermediately storing said received voice and fax data;
   an interface for interfacing to at least one data processing unit;
   an output unit for transmitting said fax data to said data processing unit via said interface; and
   a memory monitor for activating said data processing unit when said memory is filled to a predetermined capacity, whereupon at least one of said voice data and said fax data intermediately stored in said memory is transmitted to said data processing unit; and at least one of voice and fax data subsequently received via said first and second reception units, respectively, is transmitted directly from said first and second reception units to said data processing unit.

2. The telephone with integrated digital answering machine according to claim 1, wherein said voice and fax data immediately received via said first and second reception units is transmitted to said data processing unit, without being stored in said memory, when said data processing unit is activated.

3. The telephone with integrated digital answering machine according to claim 1, wherein said memory further comprises a voice memory for intermediately storing said voice data and a fax memory for intermediately storing said fax data.

4. The telephone with integrated digital answering machine according to claim 3, wherein voice data is intermediately stored in said fax memory when a first predetermined memory filling value of said voice memory is reached.

5. The telephone with integrated digital answering machine according to claim 3, wherein fax data is intermediately stored in said voice memory when a first predetermined memory filling value of said fax memory is reached.

6. The telephone with integrated digital answering machine according to claim 1, wherein said output unit further transmitting said voice data to said data processing unit.

7. The telephone with integrated digital answering machine according to claim 1, wherein said output unit reads said fax data and said voice data from said memory and transmits said fax data and said voice data to said data processing unit, when receiving an instruction thereto.

8. The telephone with integrated digital answering machine according to claim 1, further comprising:

an erase unit for erasing at least said fax data stored in said memory.

9. The telephone with integrated digital answering machine according to claim 1, further comprising:
a third reception unit for receiving fax data to be sent; and
a second transmission unit for sending said fax data received by said third reception unit via said second transmission link.

10. The telephone with integrated digital answering machine according to claim 9, wherein said third reception unit receives said fax data to be sent from said data processing unit via said interface.

11. The telephone with integrated digital answering machine according to claim 9, wherein said memory further comprises an additional memory for storing said fax data to be sent.

12. The telephone with integrated digital answering machine according to claim 1, further comprising:
a printer for printing out said received fax data.

13. The telephone with integrated digital answering machine according to claim 1, further comprising:
an operational control unit for controlling operation of said telephone according to prescribable setting information.

14. The telephone with integrated digital answering machine according to claim 13, wherein said operational control unit receives said setting information from said data processing unit.

15. The telephone with integrated digital answering machine according to claim 1, wherein said first transmission link and said second transmission link further comprise a same transmission link.

16. The telephone with integrated digital answering machine according to claim 1, wherein said first reception unit and said second reception unit further comprise a same reception unit.

* * * * *